United States Patent [19]

Yoshigai

[11] Patent Number: 5,103,938
[45] Date of Patent: Apr. 14, 1992

[54] CANTILEVER BRAKE FOR TWO WHEELED VEHICLES WITH SEPARATE STEM AND PIVOT SHAFT JOINED BY A MOUNTING BRACKET

[75] Inventor: Kenichi Yoshigai, Osaka, Japan

[73] Assignee: Yoshigai Kikai Kinzoku Co., Ltd., Osaka, Japan

[21] Appl. No.: 604,154

[22] Filed: Oct. 29, 1990

[30] Foreign Application Priority Data

Nov. 8, 1989 [JP] Japan ................................ 1-290697

[51] Int. Cl.$^5$ ............................ B62L 1/06; B62L 3/00
[52] U.S. Cl. ........................... 188/24.22; 188/24.19; 188/24.21
[58] Field of Search ............... 188/24.21, 24.22, 24.19, 188/24.15, 24.11, 2 D

[56] References Cited

U.S. PATENT DOCUMENTS 4,960,187 10/1990 Chi ................................... 188/24.12
4,969,539 11/1990 Ishibashi ........................... 188/24.21

FOREIGN PATENT DOCUMENTS 350330 11/1904 France .............................. 188/24.21
1075997 10/1954 France .............................. 188/24.21
0258498 5/1949 Switzerland ....................... 188/24.21
0500024 2/1939 United Kingdom ............. 188/24.21

*Primary Examiner*—Robert J. Oberleitner
*Assistant Examiner*—Josie A. Ballato
*Attorney, Agent, or Firm*—Sixbey, Friedman, Leedom & Ferguson

[57] ABSTRACT

A pair of inwardly projecting right and left mounting brackets are mounted on a fork carrying a wheel and a cantilever is pivotally carried on the inner end of each mounting bracket by a pivot shaft, with a brake shoe mounted on each cantilever. The mounting bracket is freely displaceable between an inwardly projected position and an outward withdrawn position.

This device thus prevents outward projection of the cantilevers while ensuring a reliable braking with a smaller operating force. It also facilitates fitting and removal of the wheel.

5 Claims, 3 Drawing Sheets

CANTILEVER BRAKE FOR TWO WHEELED VEHICLES WITH SEPARATE STEM AND PIVOT SHAFT JOINED BY A MOUNTING BRACKET

FIELD OF THE INVENTION AND RELATED ART STATEMENT

This invention relates to a brake device for a two-wheeled vehicle such as a bicycle or the like.

There is a cantilever-type brake known as a brake device for a two-wheeled vehicle such as a bicycle or the like, the structure of which is conventionally as shown in FIG. 8.

FIG. 8 shows a front wheel brake device for a bicycle, wherein numeral 1 denotes a front wheel with a tire rim 2. Designated by numeral 3 is a front fork carrying the front wheel 1, which fork has a pair of right and left pedestals 4 fixedly secured to the upper front part thereof. Each pedestal 4 is provided with a shaft 5 which pivotally carries a pair of right and left cantilevers 6. Each cantilever 6 has integrally formed therewith a shoe mounting wall 7, on which a brake shoe 8 is mounted. Top ends of the cantilever 6 are interconnected by an arch wire 9, which is connected to a brake wire 11 by means of a hanger 10 so that it can be pulled up at its center during braking.

In the brake device of this kind, the cantilevers 6 are swung inward about the shaft 5 of the pedestal 4 by way of the arch wire 9 during braking, so that the brake shoes 8 are pressed against the tire rim 2 of the front wheel from its right and left. Such a brake device has been associated with the following problems.

Since the distance A between the two shafts 5 pivotally carrying the cantilevers 6 is large, the top ends of the cantilevers 6 must be designed to extend outward to obtain a favorable expanding direction of the arch wire 9 with respect to the cantilevers 6 during braking. As a result, the top ends of the cantilevers 6 project outward beyond the lateral width of the front fork 3, resulting in an interference with other parts of the bicycle. This therefore cannot be employed especially for a vehicle of the sort requiring both design elegance and functionality, such as a mountain bike or the like, for both aesthetic and functional reasons.

Also, not only the distance A between the right and left shafts but also the distance of the shafts 5 from the tire rim 2 is large, resulting in a smaller ratio of the length C from the shaft 5 to the leading end of the brake shoe 8 to the length B of the cantilever 6. This has made it necessary to apply a greater operating force to the brake operating lever so as to obtain a required braking effect.

OBJECTS AND SUMMARY OF THE INVENTION

In view of the conventional problems as above, this invention has an object to provide a brake device which can do without outward projection of the cantilevers while being able to reliably brake the vehicle with a smaller operating force.

The brake device according to this invention has a pair of inwardly projecting right and left mounting brackets 17 fitted to the fork carrying the front wheel. The inner end of each mounting bracket pivotally carries the cantilever by means of a pivot shaft with a brake shoe secured to each cantilever.

The mounting bracket is freely displaceable between an inner projected position a and an outer withdrawn position (FIG. 2). A return spring for outwardly biasing the cantilever in direction c is incorporated in a boss at the bottom of the cantilever in direction c.

During braking, each cantilever is swung inwardly about the pivot shaft so that the brake shoes are pressed against the rim of the wheel from right and left sides thereof.

Since each said cantilever is pivotally carried by the end of the mounting bracket which projects inward from the fork toward the wheel by means of the pivot shaft 18, the distance between the right and left pivot shafts is made smaller, whereby the cantilever can be accommodated within the lateral width of the fork 14. The distance between the pivot shaft and the brake shoe is also small so that its ratio to the length of cantilever is made greater to ensure a greater braking force with a smaller operating force.

The mounting bracket is usually fixed in the inward projected position a. It is however displaced to its outward withdrawn position b when the wheel is to be removed. In this way, the mounting bracket does not interfere with fitting or removing of the wheel.

According to this invention, there are provided a pair of inwardly projecting right and left mounting brackets mounted on a fork carrying a wheel and a cantilever pivotally carried by the inner end of each said mounting bracket by means of a pivot shaft with a brake shoe mounted on each said cantilever, whereby each said cantilever has no portions projecting outwardly from the fork, while ensuring a reliable braking effort with a smaller operating force.

Also, according to this invention, the mounting bracket is freely displaceable between an inwardly projected position a and an outward withdrawn position b so that the mounting bracket does not interfere with fitting or removal of the wheel.

BRIEF DESCRIPTION OF THE DRAWINGS

FIG. 3—an enlarged view of FIG. 2 taken along the arrow III—III thereof;

FIG. 4—a view taken along the arrow IV—IV of FIG. 3;

FIG. 7—an enlarged view of FIG. 6 taken along the arrow VII—VII thereof; and

DESCRIPTION OF THE PREFERRED EMBODIMENTS

Figure 1:
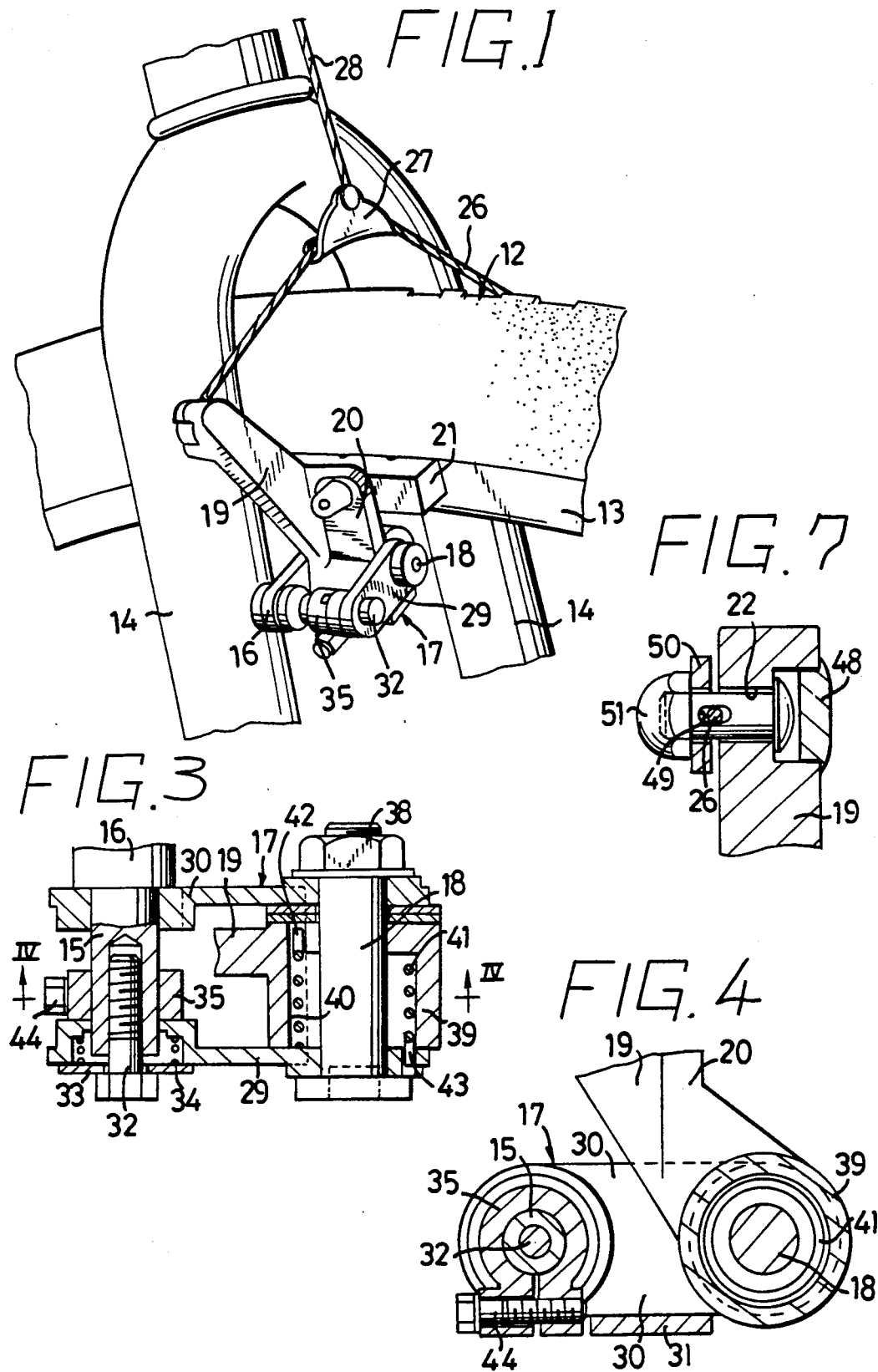
FIG. 1 is a perspective view showing the first embodiment of this invention.
Figure 2:
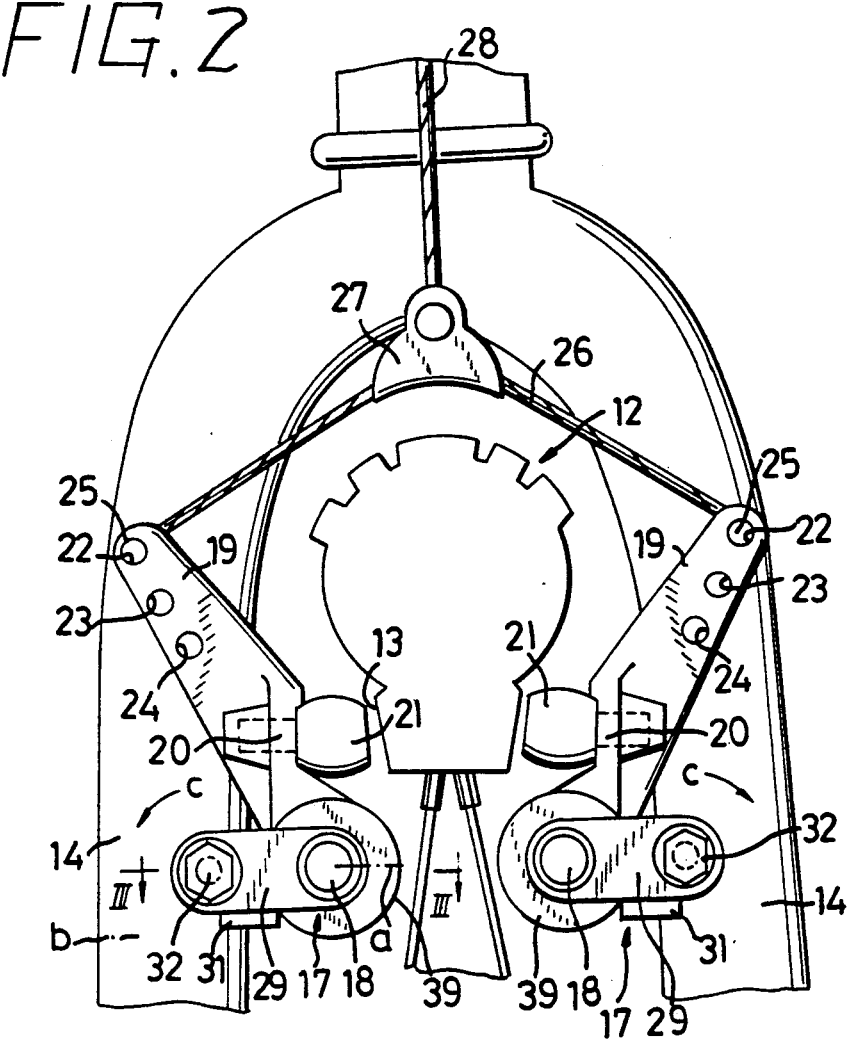
FIG. 2—a front view thereof.

The embodiments of the invention are to be described below with reference to the accompanying drawings and with the terms "inner" and "outer" being relative to the front wheel with an "inward" direction being toward the wheel and an "outward" direction being in the opposite direction. FIGS. 1 and 2 show a front wheel brake device, wherein numeral 12 indicates a front wheel with a tire rim 13. Designated by 14 is a front fork carrying the front wheel 12, which has fixedly secured on its upper front a pair of right and left pedestals 16 which, as shown in FIG. 3, are provided with stems 15. Numeral 17 denotes a pair of right and left mounting brackets inwardly projecting from the respective pedestals 16. There are a pair of right and left cantilevers 19 pivotally mounted on the inner ends of the mounting brackets by means of pivot shafts 18. Each said cantilever 19 is formed with a shoe mounting wall 20, on which a brake shoe 21 is mounted. Each said cantilever 19 is provided with plurality of longitudinal mounting holes 22, 23, 24, any one of which is adapted to receive a connector 25 for connection of an arch wire 26. The arch wire 26 is connected to a brake wire 28 by means of a hanger 27 in center.

Figure 5:
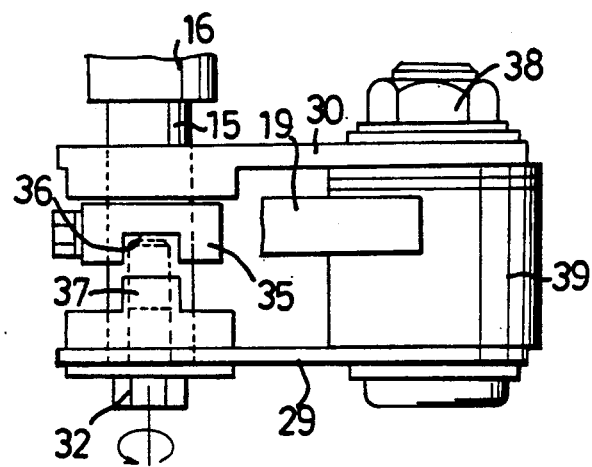
FIG. 5—a plan view illustrating the operation of the invention.
Figure 8:
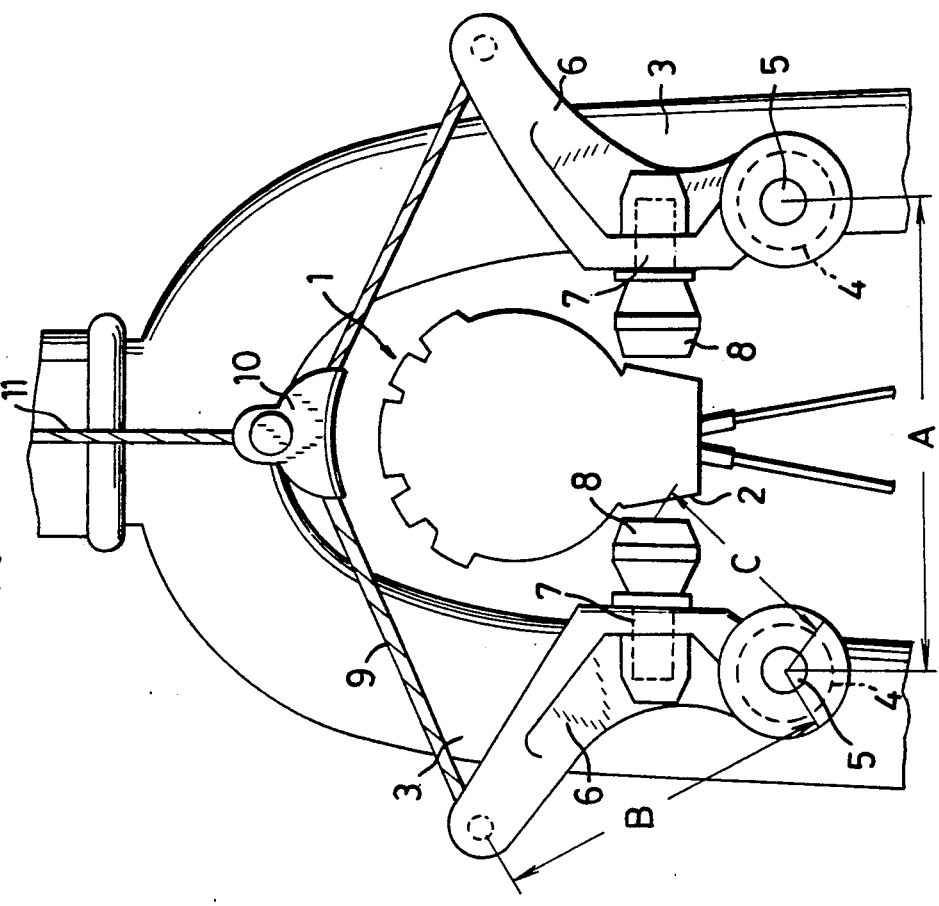
FIG. 8—a front view showing the prior art.

As shown in FIGS. 3 and 4, the mounting bracket 17 is formed by integrally joining the lower parts of a pair of front and rear links 29, 30 by means of a connecting plate 31. The outer end of each link 29 or 30 of the mounting bracket 17 is axially and circumferentially slidably received by the stem 15 of the pedestal 16 and is secured against pull-off by means of a bolt 32 screwed to the stem 15 via a washer 33. A recess in link 29 houses therein a coil spring 34 for protection against slack. A retainer ring 35 is secured to the stem 15 so as to be positioned between the link pair 29, 30, which ring 35 is formed with an engagement recess 36 as shown in FIG. 5. On the other hand, the link 29 is provided with an engagement projection 37 to be detachably engageable with the engagement recess 36. While the mounting bracket 17 can be fixedly retained at the inward projected position a by engaging the projection 37 with the recess 36 at the retainer ring 35, it can be swung about the stem 15 in direction c (FIG. 2) to assume the outward withdrawn position b by disengaging them from each other as shown in FIG. 5.

The inner end of the mounting bracket 17 has a pivot shaft 18 inserted thereinto and secured thereto by a nut 38, which shaft 18 extends across the link pair 29, 30. The pivot shaft 18 rotatably carries thereon a boss 39 formed at the base of the cantilever 19. The boss 39 has a recess 40 opening at one end, within which a return spring 41 is housed to bias the cantilever 19 outward. The return spring 41 is of the coil type wound around the pivot shaft 18, with its one end received in the engagement hole 42 of the cantilever 19 and the other in the engagement hole 43 of the link 29.

The retainer ring 35 is C-shaped and is fastened to the stem 15 by tightening a screw 44.

In the arrangement of the brake device as described above, when the brake lever is operated to apply a brake, the arch wire 26 is pulled up via brake wire 28 and hanger 27, so that the right and left cantilevers are swung inward about the pivot shaft 18, whereby the brake shoes 21 are pressed against the tire rim 13 of the front wheel 12 from right and left sides to brake the front wheel 12.

Here, the pivot shaft 18 is located inward of the mounting brackets 17 inwardly projected from the front fork 14. Since the cantilever 19 is pivotally carried by the pivot shaft 18, the distance between the right and left pivot shafts 18 is extremely small as compared to that in the prior art. For this reason, even with a design for maintaining a favorable pull-out direction of the arch wire 26 with respect to the cantilever 19, the latter can be placed within the lateral width of the front fork 14. Consequently, outward projection of the cantilever 19 beyond the fork 14 can be avoided, which benefits not only the aesthetic appearance of a bicycle but also its safety because the cantilever forms no obstacle against other parts. Since, also, the pivot shaft is close to the front wheel 12, the length from the pivot shaft 18 to the leading end of the brake shoe 21 is much smaller than the length of the cantilever 19, with the ratio of them to each other made much greater. As a result, with a smaller operating force of the brake operating lever during braking, the difference in the link ratio enables a greater braking force to be applied to the tire rim 13 of the brake shoe 21, ensuring a reliable brake with a light operating force.

The mounting bracket 17 is usually fixed at the inward projection position a. When fitting or removing the front wheel 12, however, the mounting bracket 17 may hamper the job. In order to avoid this trouble, it can be moved to the withdrawn position b by swinging it about the stem 15 as indicated by the arrow c by loosening the bolt 32. At this time, the bolt 32 should be loosened after removing the arch wire 26 from the cantilever 19. The mounting bracket 17 is then allowed to slide toward the front on the stem 15. After thus sliding the mounting bracket 17 toward front, the engagement projection 37 is removed from the recess 36 of the retainer ring 35. In a disengaged state, the mounting bracket 17 is swung about the stem 15 as indicated by the arrow c until it assumes the withdrawn position b. This eliminates any possible obstacle of the mounting bracket 17 or cantilever 19 against fitting or removing of the front wheel 12.

Figure 6:
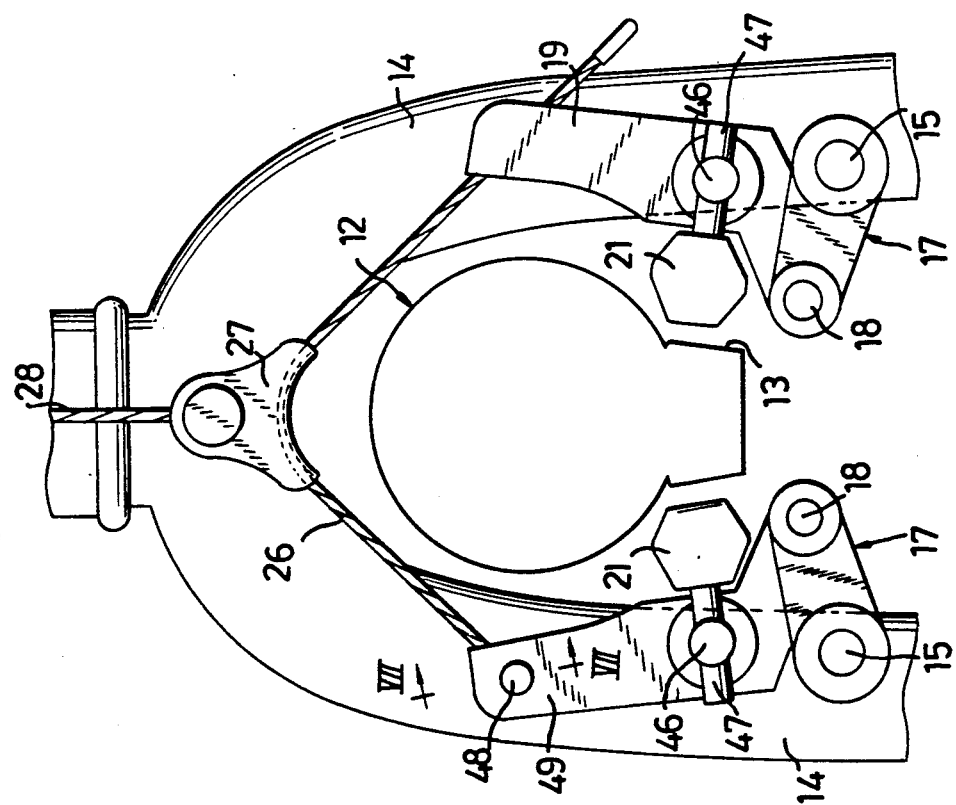
FIG. 6—a front view showing the second embodiment of the invention.

While in the embodiments shown in FIGS. 1 and 2, the cantilever 19 is shaped generally linear with the brake shoe 21 mounted on the shoe mounting wall 20, other suitable modifications are possible, as represented by the arrangement shown in FIG. 6. As shown, the cantilever 19 is curved generally to an L shape so that the apex is lower than its vertical center. The mounting part 47 of the brake shoe 21 is fixedly secured by means of the mount shaft 46 inserted into the part slightly above the apex. The mounting hole 22 formed at the upper end of the cantilever 19 is closed by a blind cap 48 of rubber or like as shown in FIG. 7, the surface of which carries a printed trademark or similar information. The slot 49 of the connector 25 inserted into the mounting hole 22 receives the arch wire 26 inserted therethrough and fastened by tightening the nut 51 via washer 50.

This invention is obviously applicable not only to the front wheel brake device but also to the rear wheel brake device.

What is claimed is:

1. A brake device for a two-wheeled vehicle comprising a pair of stems fixed to opposing sides of a fork carrying a wheel; a pair of mounting brackets, each mounting bracket having one end thereof mounted to be rotatable about a respective one of the stems; a pair of pivot shafts, each pivot shaft being mounted on a second end of a respective one of the mounting brackets; a pair of cantilevers, each cantilever being mounted to be rotatable about a respective one of the pivot shafts; fixing means for preventing each mounting bracket from rotating about the respective stem so that relative displacement between the stem and the mounting bracket is fixed in a first position of the mounting bracket in which the second end of the mounting bracket is directed inwardly toward the wheel.

2. A brake device for a two-wheeled vehicle as defined in claim 1, wherein the fixing means comprises a combination of a retainer ring formed on each stem having a recess portion and a projection releasably engaging the recess portion of the retainer ring.

3. A brake device for a two-wheeled vehicle as defined in claim 2, wherein the fixing means further comprises a spring means biasing the mounting bracket for releasing the engagement of the projection with the recess of the retainer ring, and a clamping means biasing the mounting bracket for clamping the recessed portion of the retainer ring with the stud.

4. A brake device for a two-wheeled vehicle as defined in claim 1, wherein the mounting bracket has a length such that each pivot shaft is positioned adjacent to a respective side of a tire rim when the stem and the pivot shaft are arranged in a horizontal plane, and an outer end of each cantilever is positioned to be within the width of the fork when the mounting bracket is horizontal.

5. A brake device for a two-wheeled vehicle as defined in claim 1, wherein an interspace between the pair of the mounting brackets is wide enough for a wheel to pass through when the brackets are rotated about the shafts to a second position of each bracket in which said second end of each bracket is directed outwardly relative to the wheel.

* * * * *